United States Patent [19]

Brasanti

[11] Patent Number: 4,846,767
[45] Date of Patent: Jul. 11, 1989

[54] CHAIN TRANSFER TRANSMISSION FOR SPORTS BICYCLES

[75] Inventor: Stefano Brasanti, Castello, Italy
[73] Assignee: I.C.C. Di Fiorucci Roberta, Castello, Italy
[21] Appl. No.: 195,204
[22] Filed: May 18, 1988
[30] Foreign Application Priority Data
May 19, 1987 [IT] Italy .............................. 20588 A/87
[51] Int. Cl.⁴ ............................................ F16H 11/08
[52] U.S. Cl. .................................................. 474/82
[58] Field of Search .................................. 474/77–82
[56] References Cited
U.S. PATENT DOCUMENTS
4,185,510 1/1980 Juy ........................................ 474/82

FOREIGN PATENT DOCUMENTS
1055982 4/1959 Fed. Rep. of Germany ........ 474/80

Primary Examiner—Thuy M. Bui
Attorney, Agent, or Firm—Bucknam & Archer

[57] ABSTRACT

The transmission comprises two sprockets which are mounted on respective arm members which are cantilever-wise mounted on a round cross-section rod housed in a sleeve member and resiliently counter-biassed by one or more coil springs, the sleeve member being coupled to the base of an articulated parallelogram system so as to be displaced by a pair of small cables forming a positive driving system adapted to be actuated by a small lever.

4 Claims, 2 Drawing Sheets

CHAIN TRANSFER TRANSMISSION FOR SPORTS BICYCLES

BACKGROUND OF THE INVENTION

The present invention relates to a speed trnsmission of the chain transfer type and adapted to be applied to bicycles, in particular sports bicycles.

As is known a speed transmission is presently used on bicycles for improving the bicycle efficiency, since it permits to fit the pedalling force to the road gradient.

Also known is the fact that such a speed transmission is absolutely necessary on racing bicycles and, in general, on sports bicycles.

Presently available bicycle transmissions, on the other hand, are affected by several operating drawbacks.

Some transmissions, for example, can be operated exclusively by complex operations, such as by carrying out some backward pedalling strokes or by excessively displacing operating levers and the like.

SUMMARY OF THE INVENTION

Accordingly, the main object of the present invention is to overcome the above mentioned drawbacks, by providing a speed transmission for bicycles which can be easily assembled and used.

Another object of the present invention is to provide such a speed transmission for bicycles which can be operated without interrupting the pedalling rate.

Another object of the present invention is to provide such a bicycle speed transmission which is very simple and reliable.

According to one aspect of the present invention, the above mentioned objects, as well as yet other objects, which will become more apparent hereinafter, are achieved by a speed transmission for bicycles characterized in that said speed transmission essentially comprises two sprockets, mounted on corresponding arm members cantilever wise applied on a round crosssection rod which is housed in a sleeve member and resiliently rotatively counterbiassed, preferably by means of one or more coil springs; said sleeve member being coupled to the base of an articulated parallelogram system so as to be displaced, with a parallel to itself relationship, by means of two driving cables forming a positive driving system adapted to be actuated by a lever.

BRIEF DESCRIPTION OF THE DRAWINGS

Further characteristics and advantages of the bicycle speed transmission according to the present invention will become more apparent hereinafter from the following detailed description of a preferred embodiment thereof, being illustrated, by way of an indicative but not limitative example, in the figures of the accompanying drawings, where.

DESCRIPTION OF THE PREFERRED EMBODIMENT

Figure 1:
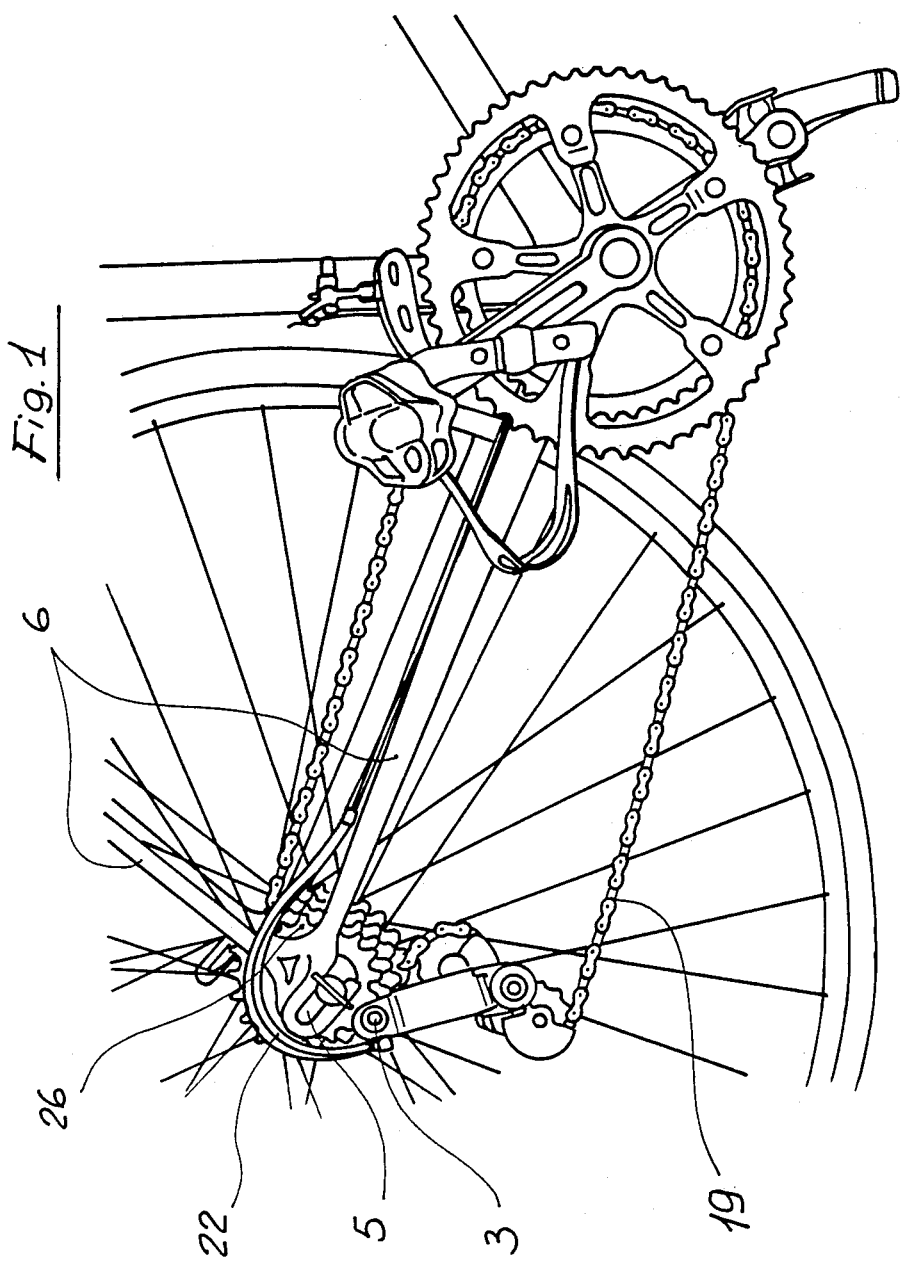
FIG. 1 is a schematic view illustrating the speed transmission according to the invention mounted on a racing or sports bicycle.
Figure 2:
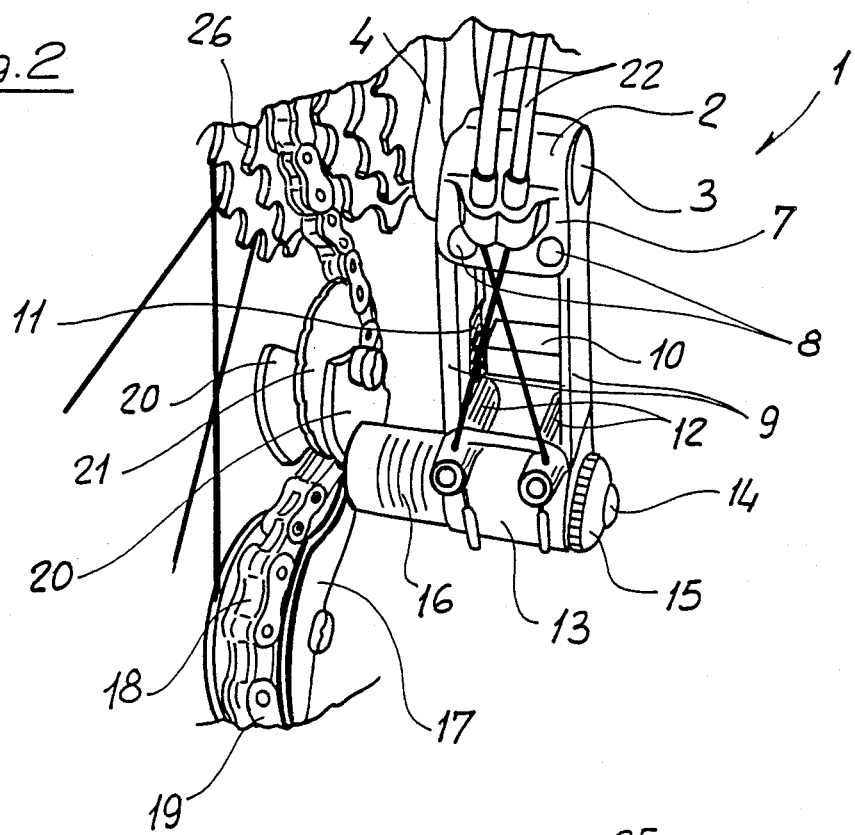
FIG. 2 is a rear view of the same speed transmission.
Figure 3:
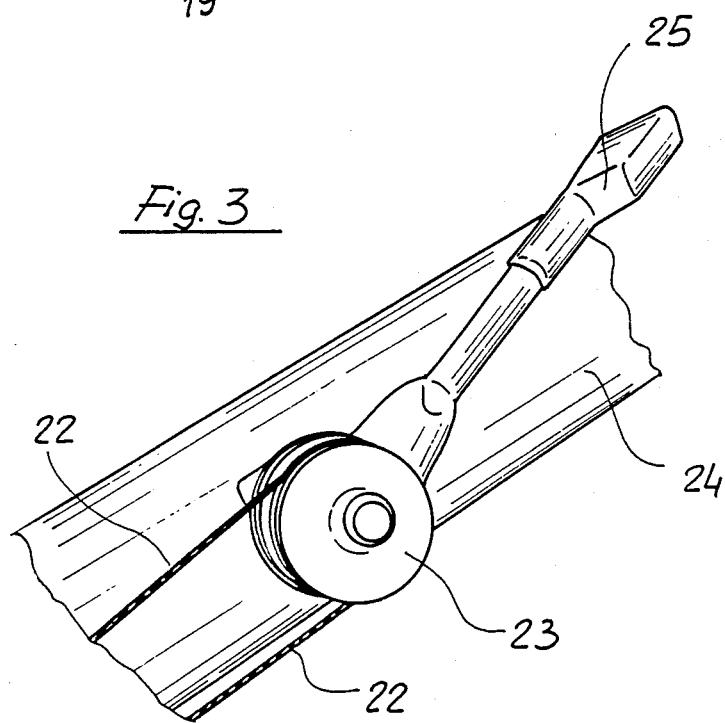
FIG. 3 shows a knob member for actuating the bicycle speed transmission according to the present invention.

With reference to the figures of the accompanying drawings, the bicycle speed transmission according to the present invention, which has been generally indicated at the reference number 1, comprises a sleeve member 2 adapted for mounting said transmission, through a pin 3, on a lug extension 4 which is formed on the perimeter of chain stretching slot 5 provided on the rear forks.

The sleeve member is provided with two plate lugs 7, downwardly directed, adapted to restrain two cylindrical rods 8 thereto respective small plates 9 are rotatably connected.

One of said small plates supports at the intermediate portion thereof a perpendicularly extending round cross-section rod 10, facing the other small plate and provided, at its free end, with a resiliently counterbiassed tip pawl 11'.

The two mentioned small plates, moreover, are articulated at the bottom to a pair of pins 12 which are rigid with corresponding brackets restraining a horizontally extending sleeve 13.

This sleeve houses a pin 14 which is locked in position by means of a ring nut 15 and encompassed by a coil spring 16' able of partially turning a projecting tubular element 16 which is coaxial with said sleeve and supports a shaped arm member 17 perpendicular to the axis of said tubular element.

On said shaped arm member a first sprocket 18 is pivoted, the teeth of which engage with the links of the chain 19.

To the mentioned pin housed in said bottom sleeve there is moreover coupled a second arm member 20 which is able of resiliently swinging through a small circle arc and supports a second sprocket 21 adapted to suitably stretch said chain.

On the pins 12 mounting through brackets the bottom sleeve 13 there are mounted the end portions of a pair of flexible cables 22 the other ends of which are coupled, at opposite sides, in the groove of a small pulley 23 pivoted on the slanted frame tube 24 of the bicycle frame and rotatably driven by a small lever 25.

The cable pair substantially forms a positive driving system affecting the articulated parallelogram consisting of the small plates 9 and sleeve 13.

More specifically, by pulling either one or the other of said small cables, the mentioned sleeve will be displaced in a direction or the opposite direction, thereby driving the two sprockets 18 and 21.

In this connection it should be pointed out that the mentioned sleeve is displaced by subsequent steps, because of the engaging of the tip pawl 11' supported by the round cross section rod 10 on the rack portion 11.

Thus, the two mentioned sprockets will be firmly arranged under one of the tooth pluralities of the pignon 26, which is selected by the cyclist.

In particular, the sprocket 18 is able, as it is displaced, of driving the bicycle chain from one onto the other of the mentioned tooth pluralities, whereas the sprocket, or idle wheel 21, in addition to operatively cooperating with the mentioned sprocket 18, is able of suitably stretching or drawing the bicycle chain.

From the above disclosure and the figures of the accompanying drawings, it should be apparent that the invention fully achieves the intended objects.

While the invention has been disclosed and illustrated with reference to a preferred embodiment thereof, it should be apparent that the disclosed embodiment is susceptible to several modifications and variations all of which will come within the spirit and scope of the appended claims.

I claim:

1. A speed transmission for bicycles comprising two sprockets mounted on respective arm members which are mounted cantilever-wise on a round cross-section rod housed in a first horizontal axis sleeve member and rotatively resiliently counterbiassed, said sleeve member being movably coupled to an arm of an articulated parallelogram system, so as to be displaced in two directions by pair of cables forming a positive driving system adapted to be actuated by a lever, a second sleeve member adapted to be coupled, through a pin, to a lug extension formed on the perimeter of a chain stretching slot provided on the bicycle rear fork, said second sleeve member being provided with two plate like lugs tangential therewith and downwardly turned, which restrain two cylindrical rods thereto there are rotatively coupled corresponding small plates, one of said small plates supporting, at an intermediate portion thereof, a perpendicular round cross-section rod, facing the other of said small plates and provided, at its free end, with a resiliently counterbiassed tip pawl, said tip pawl being adapted to engage in a tooth of a rack formed on an inner wall of said other small plate.

2. A speed transmission structure for bicycles, according to claim 1, wherein said two small plates are articulated, at the bottom, to a pair of pins rigid with respective brackets restraining said first horizontal axis sleeve member, said first horizontal axis sleeve member housing a pin locked in its position by a ring nut and encompassed by a coil spring adapted to partially turn a projecting tubular member coaxial with said first horizontal axis sleeve member and bearing a shaped arm member perpendicular to the axis of said tubular member and thereon a first sprocket is pivoted, said first sprocket engaging with the bicycle chain.

3. A speed transmission structure for bicycles, according to claim 2, wherein to said pin housed in said first sleeve member there is coupled a second arm member, able of resiliently swinging through a small circle arc and supporting a second sprocket able to suitably stretch said chain.

4. A speed transmission structure for bicycles, according to claim 1, wherein to the pins restraining, through brackets, said first sleeve member there are connected the end portions of a pair of flexible cables having their other ends engaged, at opposite sides, in a pulley pivoted on a slanted tube of the bicycle frame and adapted to be rotatively actuated by a lever.

* * * * *